US009815671B2

(12) United States Patent
Nield

(10) Patent No.: US 9,815,671 B2
(45) Date of Patent: Nov. 14, 2017

(54) SYSTEM AND METHOD FOR OPERATING A BRAKE LEVER

(75) Inventor: Barry Nield, Greenville, SC (US)

(73) Assignee: Barry Nield, Greenville, SC (US)

( * ) Notice: Subject to any disclaimer, the term of this patent is extended or adjusted under 35 U.S.C. 154(b) by 1085 days.

(21) Appl. No.: 13/347,166

(22) Filed: Jan. 10, 2012

(65) Prior Publication Data

US 2013/0175123 A1    Jul. 11, 2013

(51) Int. Cl.
*B60T 7/10*     (2006.01)
*B66D 5/10*     (2006.01)
*E21B 19/00*    (2006.01)
*F16D 49/08*    (2006.01)

(52) U.S. Cl.
CPC ............... *B66D 5/10* (2013.01); *B60T 7/104* (2013.01); *E21B 19/008* (2013.01); *F16D 49/08* (2013.01)

(58) Field of Classification Search
CPC ......... B66D 5/10; B60T 7/104; E21B 19/008; F16D 49/08
USPC ...... 188/34, 72.9, 24.11–24.21; 74/519, 527, 74/529, 535, 537, 536, 821, 822, 813 L, 74/814; 242/395, 395.1
See application file for complete search history.

(56) References Cited

U.S. PATENT DOCUMENTS

| 4,696,377 | A | | 9/1987 | Richardson et al. |
| 5,042,317 | A | * | 8/1991 | Malara ............................ 74/529 |
| 5,269,098 | A | * | 12/1993 | Redman ......................... 49/360 |
| 5,313,892 | A | * | 5/1994 | Tice ............................... 108/147 |
| 6,705,436 | B2 | * | 3/2004 | Noll et al. .................... 188/72.9 |
| 6,745,487 | B1 | | 6/2004 | Nield |
| 7,138,925 | B2 | | 11/2006 | Nield |
| 7,513,338 | B2 | | 4/2009 | Newman |
| 7,559,411 | B2 | * | 7/2009 | Michel et al. .................. 188/34 |
| 2003/0015380 | A1 | * | 1/2003 | Sykes et al. .................. 188/2 D |
| 2004/0099784 | A1 | * | 5/2004 | Kienholz ....................... 248/550 |
| 2006/0053953 | A1 | * | 3/2006 | Choi, II .......................... 74/527 |
| 2008/0277214 | A1 | * | 11/2008 | Chang ........................... 188/161 |
| 2011/0174538 | A1 | * | 7/2011 | Chan .............................. 175/24 |

* cited by examiner

*Primary Examiner* — Robert A Siconolfi
(74) *Attorney, Agent, or Firm* — Dority & Manning, P.A.

(57) ABSTRACT

A system for operating a brake lever includes a handle and a lock having a first position that prevents pivotal movement of the handle with respect to the lever and a second position that allows pivotal movement of the handle with respect to the lever. A method for operating a brake lever includes locking a handle to the lever to prevent pivotal movement between the handle and the lever and manually positioning the lever to apply and release the brake. The method further includes unlocking the handle from the lever to permit pivotal movement between the handle and the lever and automatically positioning the lever to apply the brake.

20 Claims, 4 Drawing Sheets

SYSTEM AND METHOD FOR OPERATING A BRAKE LEVER

FIELD OF THE INVENTION

The present disclosure generally involves a system and method for controlling a brake. In particular embodiments, the system and method may be incorporated into a drawworks or hoist to reduce or prevent personnel injury or equipment damage during manual and automatic operation of the brake.

BACKGROUND OF THE INVENTION

Drilling rigs often include a machine known as a drawworks or hoist for raising and lowering piping and drill bits. A typical drawworks includes drill line wound around a large drum or spool. The drill line extends from the drum through a pulley or other block and tackle arrangement to a travelling block. A drive system rotates the drum to reel in the drill line, and a brake lever may be manually operated to apply or release a brake connected to the drum. For example, the brake lever may be positioned to manually release the brake to allow the drive system to rotate the drum to reel in the drill line and raise the travelling block. Alternately, the drive system may be disconnected from the drum, and the brake lever may be positioned to manually release the brake to allow the weight of the travelling block to rotate the drum to release drill line from the drum and lower the travelling block.

The weight of the travelling block and drill pipe is typically hundreds of tons. As a result, the travelling block may cause substantial equipment damage and/or personnel injury if the travelling block were raised or lowered beyond established limits. Therefore, various safety devices, systems, and/or interlocks have been developed to prevent the travelling block from travelling beyond established limits. For example, U.S. Pat. No. 7,138,925 describes a control system that senses the position, movement, and/or rate of movement of the travelling block to automatically actuate the brake to prevent the travelling block from exceeding predetermined limits. Although effective at limiting movement of the travelling block, the automatic actuation of the brake may also rapidly and forcefully move the brake lever, causing surprise, personnel injury, and/or equipment damage for personnel or objects in the path of the brake lever. Therefore, a system and method for operating a brake lever that reduces or prevents surprise, personnel injury, and/or equipment damage would be useful.

BRIEF DESCRIPTION OF THE INVENTION

Aspects and advantages of the invention are set forth below in the following description, or may be obvious from the description, or may be learned through practice of the invention.

One embodiment of the present invention is a system for operating a brake lever that includes a handle and a lock having a first position that prevents pivotal movement of the handle with respect to the lever and a second position that allows pivotal movement of the handle with respect to the lever.

Another embodiment of the present invention is a system for operating a brake lever that includes a handle and a brace having a first connection to the handle and a second connection to the lever, wherein one of the first connection or the second connection is a pivotal connection. A lock has a first position that prevents pivotal movement of the pivotal connection and a second position that allows pivotal movement of the pivotal connection.

The present invention may also include a method for operating a brake lever that includes locking a handle to the lever to prevent pivotal movement between the handle and the lever and manually positioning the lever to apply and release the brake. The method further includes unlocking the handle from the lever to permit pivotal movement between the handle and the lever and automatically positioning the lever to apply the brake.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
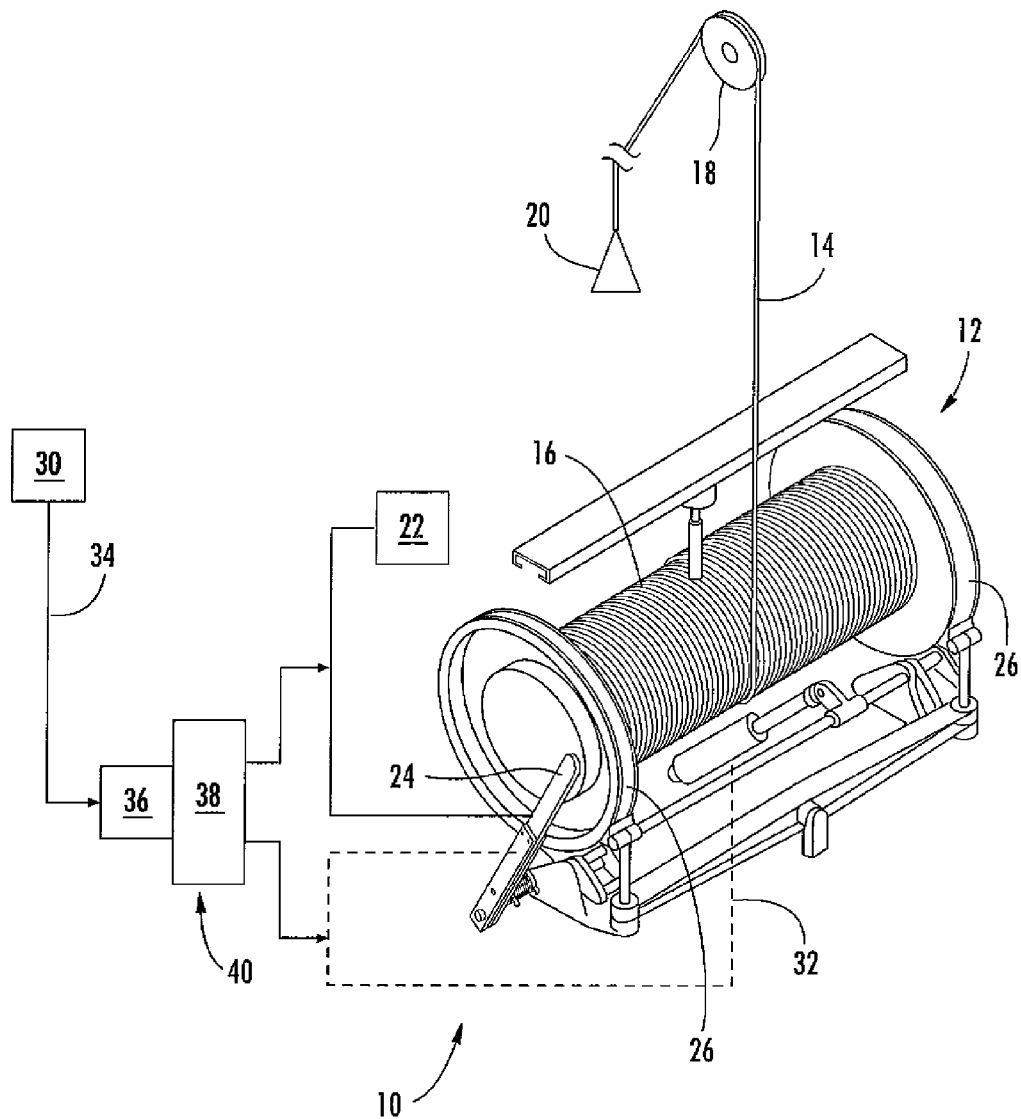
FIG. 1 is a functional diagram of a system according to one embodiment of the present invention aligned for manual operation.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for operating a brake lever. Although particular embodiments of the present invention may be described in the context of a brake lever connected to a drawworks 14 or other hoist machinery, one of ordinary skill in the art will readily appreciate that the present invention is not limited to use with a drawworks unless specifically recited in the claims.

FIG. 1 provides a functional diagram of a system 10 according to one embodiment of the present invention installed or incorporated into a drawworks 12 or hoist, such as might be used in drilling operations. As shown in FIG. 1, the drawworks 12 generally includes drill line 14 wound around a large drum 16 or spool. The drill line 14 extends from the drum 16 through a pulley 18 or other block and tackle arrangement to a travelling block 20. A drive system 22 is mechanically connected to the drum 16 to rotate the drum 16 to reel in the drill line 14, and a brake lever 24 may be manually operated to apply or release a brake connected to the drum 16. The brake may include, for example, a strap 26 that loops over one or both ends of the drum 16, and the lever 24 may be connected to the strap 26 to alternately loosen or tighten the friction between the strap 26 and the drum 16 to manually control the brake force applied to the drum 16. In the particular embodiment shown in FIG. 1, the lever 24 may be manually lifted or rotated counterclockwise to loosen the strap 26 around the drum 16 to allow the drive system 22 to rotate the drum 16 to reel in the drill line 14 and raise the travelling block 20. Alternately, the drive system 22 may be disengaged from the drum 16, and the lever 24 may be manually lifted or rotated counterclockwise to loosen the strap 28 around the drum 16 to allow the weight of the travelling block 20 to rotate the drum 16 to release drill line 14 from the drum 16 and lower the travelling block 20. When the travelling block 20 is at the desired position, the lever 24 may be manually pushed down or rotated clockwise to tighten the strap 28 around the drum 16 to stop further movement of the travelling block 20.

The drawworks 12 may further include a safety system to automatically operate the brake to prevent the travelling block 20 from exceeding one or more predetermined limits. U.S. Pat. No. 7,138,925, the entirety of which is incorporated herein for all purposes, describes one such safety system; however, the present invention is not limited to any particular safety system unless specifically recited in the claims. As shown in FIG. 1, the safety system may include, for example, a controller 30 and an actuator 32 operably connected to the lever 24. The controller 30 may sense the position, movement, and/or rate of movement of the travelling block 20 and transmit a signal 34 to a solenoid 36. The solenoid 36 may in turn position a valve 38 in response to the signal 34 to alternately port or apply an operating fluid 40 to the drive system 22 and the actuator 32. The operating fluid 40 may be any pneumatic or hydraulic fluid, and the actuator 32 may similarly include a pneumatic or hydraulic piston, although particular embodiments of the present invention are not so limited unless recited in the claims. In the particular configuration shown in FIG. 1, the signal 34 provided by the controller 30 indicates that the position, movement, and/or rate of movement of the travelling block 20 is within the predetermined limits. As a result, the solenoid 36 positions the valve 38 to simultaneously port the operating fluid 40 from the actuator 32 and apply the operating fluid 40 to the drive system 22 to allow manual operation of the lever 24 to raise or lower the travelling block 20.

Figure 2:
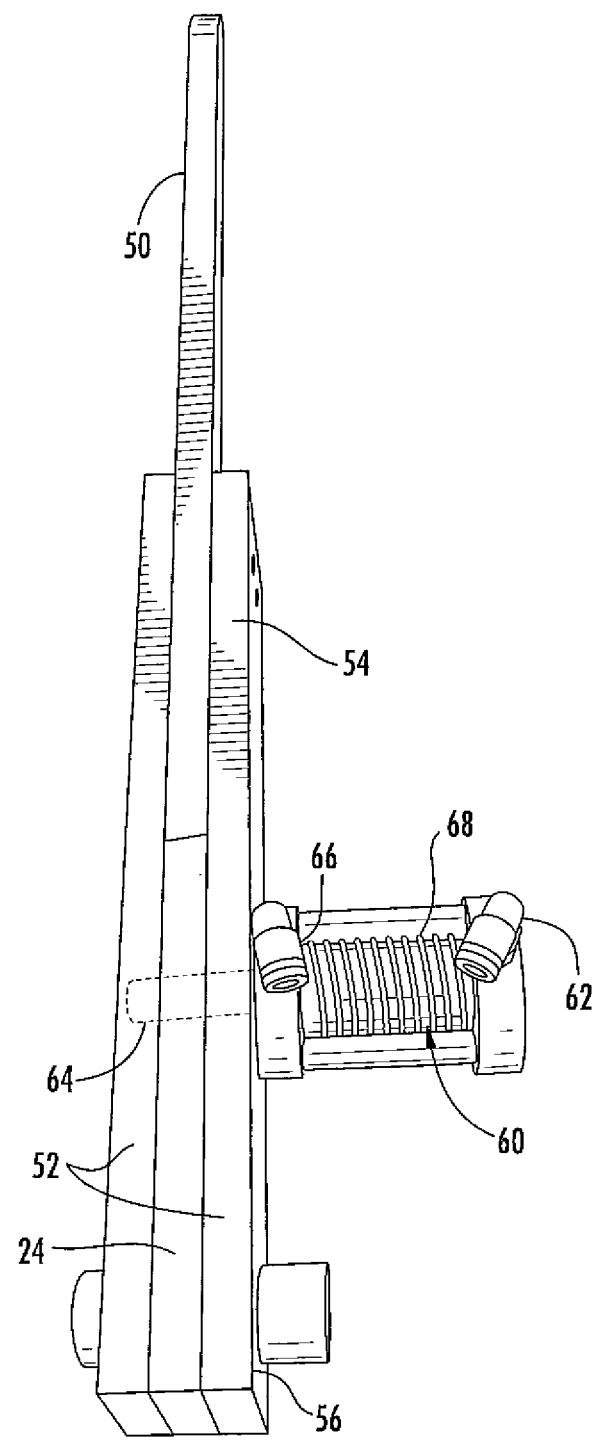
FIG. 2 is an enlarged perspective view of the brake lever shown in FIG. 1 during manual operation of the brake.

FIG. 2 provides an enlarged perspective view of the lever 24 shown in FIG. 1 during manual operation. As shown, a handle 50 is operably connected to the lever 24 to increase the mechanical advantage for manually positioning the lever 24 to loosen or tighten the strap 28 around the drum 16. One of ordinary skill in the art can readily appreciate multiple structures and methods for operably connecting the handle 50 to the lever 24. For example, as shown in FIG. 2, one or more braces 52 may extend along at least a portion of the handle 50 and the lever 24. The brace 52 may have a first connection 54 fixedly connected to the handle 50 and a second connection 56 pivotally connected to the lever 24. In alternate embodiments, the first connection 54 may be pivotally connected to the handle 50, and the second connection 56 may be fixedly connected to the lever 24.

A lock 60 between the lever 24 and the handle 50 reduces or prevents surprise, personnel injury, and/or equipment damage during manual or automatic operation of the brake. The lock 60 may include any structure or device that has a first position (shown in FIG. 2) that prevents pivotal movement of the handle 50 with respect to the lever 24 and a second position (shown in FIG. 4) that allows pivotal movement of the handle 50 with respect to the lever 24. For example, as shown in FIG. 2, the lock 60 may include a first port 62 connected to a piston 64. During manual operation, the solenoid 36 may position the valve 38 to apply the operating fluid 40 to the first port 62 to extend the piston 64 through the lever 24 and the brace 52 in the first position. In this manner, the piston 64 fixedly connects the lever 24 to the brace 52, preventing pivotal movement between the brace 52 and the lever 24, and thus the handle 50, in the first position. As a result, an operator may manually raise or lower the handle 50 to alternately loosen or tighten the strap 28 around the drum 16 to release or apply the brake.

Figure 3:
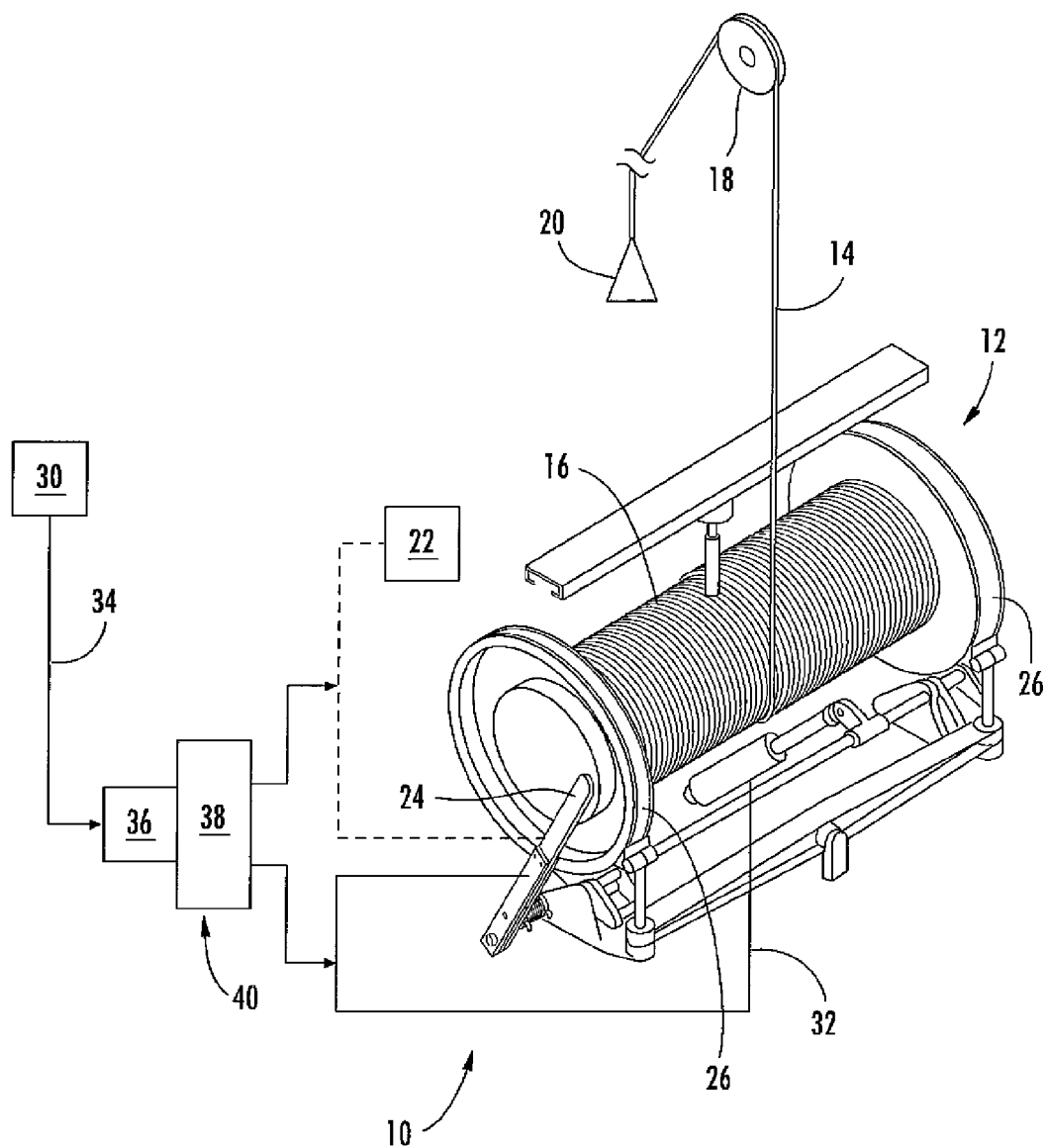
FIG. 3 is a functional diagram of the system shown in FIG. 1 aligned for automatic operation.

FIG. 3 provides a functional diagram of the system 10 shown in FIG. 1 during automatic operation of the brake. As shown, the signal 34 provided by the controller 30 indicates that the position, movement, and/or rate of movement of the travelling block 20 is approaching the predetermined limits. As a result, the solenoid 36 positions the valve 38 to simultaneously port the operating fluid 40 from the drive system 22 and apply the operating fluid 40 to the actuator 34. The operating fluid 40 extends the actuator 32 to automatically push the lever 24 down or rotate the lever 24 clockwise to tighten the strap 28 around the drum 16 to stop further movement of the travelling block 20.

Figure 4:
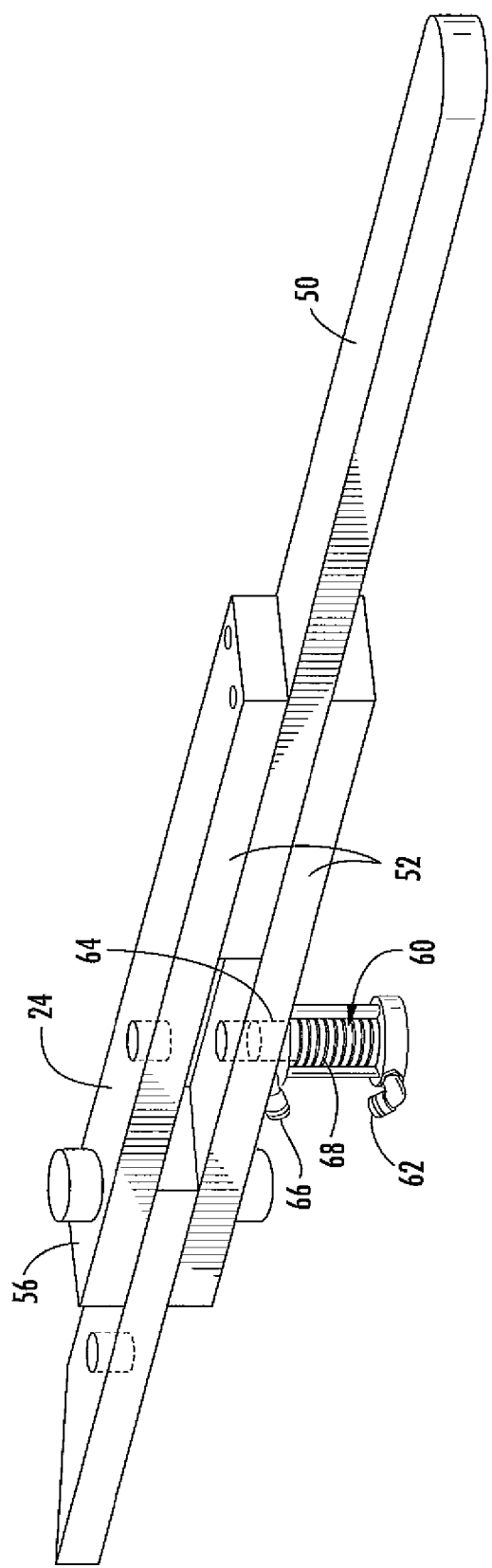
FIG. 4 is an enlarged perspective view of the brake lever shown in FIG. 3 during automatic operation of the brake.

FIG. 4 provides an enlarged perspective view of the lever 24 shown in FIG. 3 during automatic operation. As shown, during automatic operation, the solenoid 36 may position the valve 38 to apply the operating fluid 40 to a second port 66 to retract the piston 64 from the lever 24 in the second position. In this manner, the piston 64 allows pivotal movement between the brace 52 and the lever 24, and thus the handle 50, in the second position. As a result, the handle 50 may pivot with respect to the lever 24 to reduce or prevent surprise, personnel injury, and/or equipment damage during automatic operation of the brake.

As shown in FIGS. 1-4, the solenoid 36, valve 38, and common operating fluid 40 may be used to simultaneously operate the drive system 22, actuator 32, and lock 60 to ensure reliable manual and automatic operation of the brake. Specifically, the solenoid 36 and valve 38 effectively operate as an interlock to ensure that the operating fluid 40 is simultaneously applied to the drive system 22 and the first port 62 when manually operating the brake and to the actuator 32 and the second port 66 when automatically operating the brake. In particular embodiments, the lock 60 may be biased to the second position to ensure retraction of the piston 64 prior to operation of the actuator 34. For example, a spring 68 or other biasing device may be connected to the piston 64 to bias the piston 64 to the second position.

The system 10 shown FIGS. 1-4 may be readily added to existing drawworks or hoists. For example, the existing lever 24 may be cut, and the handle 50 may be rotatably connected to the lever 24. As previously described, the braces 52 may be fixedly connected to either the lever 24 or the handle 50 and pivotally connected to the other of the handle 50 or the lever 24. Locking holes may be drilled through the braces 52 and the lever 24, and the lock 60 may be attached to the braces 52. The first and second ports 62, 66 may then be operably connected to existing operation fluid 40 lines in the manner shown in FIGS. 1 and 3.

The system 10 shown in FIGS. 1-4 may also provide a method for operating the brake lever 24. The method may include locking the handle 50 to the lever 24 to prevent pivotal movement between the handle 50 and the lever 24 and manually positioning the lever 24 to apply and release the brake 26. The method may further include unlocking the handle 50 from the lever 24 to permit pivotal movement between the handle 50 and the lever 24 and automatically positioning the lever 24 to apply the brake 26.

In particular embodiments, the method may further include inserting the piston 64 through the lever 24 and/or operating the solenoid 36 to actuate the lock 60 between the handle 50 and the lever 24. In other particular embodiments, the method may include flowing the operating fluid 40 to actuate the lock 60 between the handle 50 and the lever 24 and/or biasing the lock 60 between the handle 50 and the lever 24 to an unlocked position.

This written description uses examples to disclose the invention, including the best mode, and also to enable any person skilled in the art to practice the invention, including making and using any systems or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for operating a brake lever, comprising:
   a. a handle; and
   b. a lock having a first position that prevents pivotal movement of said handle with respect to the lever in any direction and a second position that allows pivotal movement of said handle with respect to the lever.
2. The system as in claim 1, wherein said lock comprises a piston inserted through the lever in said first position.
3. The system as in claim 1, wherein said lock is biased to said second position.
4. The system as in claim 1, further comprising a brace having a first connection to said handle and a second connection to the lever, wherein one of said first connection or said second connection is a pivotal connection.
5. The system as in claim 1, wherein said lock prevents pivotal movement between said brace and the lever in said first position.
6. The system as in claim 5, wherein said lock allows pivotal movement between said brace and the lever in the second position.
7. The system as in claim 1, further comprising an operating fluid that actuates said lock.
8. The system as in claim 1, further comprising a solenoid that actuates said lock.
9. A system for operating a brake lever, comprising:
   a. a handle;
   b. a brace having a first connection to said handle and a second connection to the lever, wherein one of said first connection or said second connection is a pivotal connection; and
   c. a lock having a first position that prevents pivotal movement of said pivotal connection in any and a second position that allows pivotal movement of said pivotal connection.
10. The system as in claim 9, wherein said lock comprises a piston inserted through the lever in said first position.
11. The system as in claim 9, wherein said lock is biased to said second position.
12. The system as in claim 9, wherein said lock prevents pivotal movement between said brace and the lever in said first position.
13. The system as in claim 9, wherein said lock allows pivotal movement between said brace and the lever in the second position.
14. The system as in claim 9, further comprising an operating fluid that actuates said lock.
15. The system as in claim 9, further comprising a solenoid that actuates said lock.
16. A method for operating a brake lever, comprising:
    a. locking a handle to the lever to prevent pivotal movement between said handle and the lever in any direction;
    b. manually positioning the lever to apply and release the brake;
    c. unlocking said handle from the lever to permit pivotal movement between said handle and the lever; and
    d. automatically positioning the lever to apply the brake.
17. The method as in claim 16, further comprising inserting a piston through the lever.
18. The method as in claim 16, further comprising biasing a lock between said handle and the lever to an unlocked position.
19. The method as in claim 16, further comprising flowing an operating fluid to actuate a lock between said handle and the lever.
20. The method as in claim 16, further comprising operating a solenoid to actuate a lock between said handle and the lever.

* * * * *